United States Patent Office 3,686,011
Patented Aug. 22, 1972

3,686,011
SATIN-WHITE FOR USE IN PAPER GLAZE, PAINTS AND THE LIKE, AND PROCESS FOR THE PRODUCTION THEREOF
Paola Casini, Terni, and Virginia Mollaretti, Milan, Italy, assignors to Bianco Satin S.r.l, Andrea Doria, Milan, Italy
No Drawing. Filed Dec. 1, 1970, Ser. No. 94,160
Claims priority, application Italy, Dec. 10, 1969, 42,098
Int. Cl. C09c 1/02
U.S. Cl. 106—306            7 Claims

ABSTRACT OF THE DISCLOSURE

A satin white filler prepared with a process according to which the free alkalinity of the calcium sulfoaluminate is at least partially neutralized with an organic aliphatic acid having from 12 to 20 carbon atoms.

BACKGROUND OF THE INVENTION

The present invention relates to satin white fillers and in particular to a process for manufacturing satin white having a neutralized free alkalinity.

Satin white is a valuable filler which is employed in the preparation of glazes for producing high-quality glazed paper, it might also be employed in formulating water-vehicle paints or, after drying, in formulating organic-vehicle paints.

In present days, various types of satin white having different free calcium hydrate contents are commercially available. The various types of presently known satin white, when employed in formulating glazes for glazed paper, involves the following drawbacks:

(1) the difficulty of being admixed with the other pigments, which may be present during the preparation of the glaze;
(2) the excessive quantity of either natural or synthetic binder required for producing the glaze, which raises the cost of the finished product;
(3) a non-adjustable variation in the rheologic flow of the glaze, caused by the very nature of the product which, in some cases, may result in the inutilization of the glaze; and
(4) generally a high pH of the glazed paper, which does not always make it possible to use the finished product in printing operations according to pre-established projects.

It has been found that these defaults of the various types of satin white now available in trade are removed if the high free alkalinity is neutralized.

SUMMARY OF THE INVENTION

We have now found that if the free alkalinity is neutralized with an organic aliphatic acid having from 12 to 20 carbon atoms the final product has surprisingly good properties. Satin white neutralized according to the present invention shows constant quality characteristics free from any uncertainties and makes it possible to obtain glazes having a high solid content, and more than acceptable viscosities, which may be applied using up-to-date, high-speed glazing machines; it enables to obtain glazes with a high covering capacity and, consequently, an excellent opacity of the glazed paper, together with a constant pH of the glaze. The use of satin white having a neutralized free alkalinity according to the present invention more over consent to achieve a high platability of the glazed paper under the effect of calendering, as well as a high absorption power of the glazed paper towards the inks during the use thereof in printing operations and furthermore a high stability of the product when stored. In addition to the above, it may be said that the use of the product according to the present invention makes it possible to save both natural and synthetic binder in the preparation of glazes, as compared with the products already available in trade. Satin white having a neutralized free alkalinity according to the present invention is mechanically stable, even when subjected to the considerable stresses exerted by the shearing forces of modern, high-speed glazing machines.

Satin white according to the present invention is produced by a simple process, comprising two steps, the first of which consists in the production of an usual satin white filler, the second in neutralizing the calcium hydrate with an organic aliphatic acid having from 12 to 20 carbon atoms.

DETAILED DESCRIPTION OF THE INVENTION

More specifically, the process according to the present invention includes the following operations: hydrated lime is caused to react in an aqueous solution containing inorganic dispersing agents, such as e.g. sodium tripolyphosphate, with alumina sulfate in an aqueous solution, while stirring energically, at room temperature; once the reaction is completed, an organic dispersing agent is added, such as e.g. a polyacrylate, in order to cause fluidization. Then, still under stirring, the organic aliphatic acid in an aqueous emulsion is added in order to neutralize the free calcium hydrate up to the desired pH, with the formation of the corresponding calcium salt in the product itself. Finally, in order to further neutralize the still existing excess of calcium hydrate, ammonium sulfate in an aqueous solution may be added, which causes the formation of calcium sulfate and ammonium hydrate. The use of ammonium sulfate for further neutralizing the residual alkalinity is optional and is recommendable for reducing the costs of reagents.

The final product contains a usual satin white, i.e. a calcium sulfoaluminate corresponding to the formula $3CaO.Al_2O_3.3\ CaSO_4.yH_2O$, in admixture with the calcium salt of the organic acid used and, if the optional further neutralization has been effected, with calcium sulfate and ammonium hydrate.

The use of an organic aliphatic acid having from 12 to 20 C. for neutralizing the free alkalinity in the raw satin white has the main advantage that the calcium salt resulting from said neutralization remains in the final composition making it particularly suitable for use in the preparation of glazes.

The optional use of ammonium sulfate for a further neutralization of the product has the advantage that the ammonium hydrate resulting from said further neutralization remains in the final product improving in this way some of its characteristics, for instance its viscosity properties.

Aliphatic acids suitable for the purposes of this invention are those having from 12 to 20 carbon atoms in their molecule. Fatty acids are the most preferred and among them stearic acid and its closed homologues give the best results.

EXAMPLE

A suspension (A) was prepared suspending 300 gr. of CaO in 1500 cc. $H_2O$, the resulting suspension was filtered and then added with 60 gr. of sodium tripolyphosphate.

In a different container a solution (B) of 535 gr. of commercial alumina sulfate (having a content of 17–18% in ($Al_2O_3$) in 1400 cc. $H_2O$ was prepared.

The solution (B) was then slowly added to the suspension (A) kept under continuous stirring in a reactor provided with a refrigerating apparatus. The temperature in the reactor was maintained in the range between 30 and 45° C. in order to have a final product with the best crystal structure. The resulting suspension of calcium sulfoaluminate had a pH value of 11 and a rather high viscosity.

The viscosity of the suspension was lowered adding to the suspension 20 gr. of an organic chelating-dispersing agent ("DISPEX N 50").

Free alkalinity of the suspension was then neutralized with an emulsion in 100 gr. $H_2O$ of 50 gr. of commercial stearine having a melting temperature of 55–57° C. After the neutralization the product had a pH of 9.9 and a content of calcium stearate corresponding to about 7% of the weight of the final product.

The final product was then used in the preparation of a glaze for paper which had substantially better properties with respect to a glaze of identical formulation but prepared using a commercial satin white.

It will be clear to those skilled in the art that, instead of stearic acid or stearin, it is possible to employ any other homologue, fatty acid or a salt, or ester, or amide thereof, with the formation of the corresponding calcium salt. The present invention is therefore not intended to be restricted to the above mentioned composition, but includes any possible variants falling within the scope of the appended claims.

What is claimed is:

1. In a process for the preparation of satin white by reaction of calcium hydrate with alumina sulfate, the improvement comprising neutralizing the free alkalinity in the reaction product with an aliphatic acid having from 12 to 20 carbon atoms and leaving the resulting calcium salt in the final product.

2. Process according to claim 1, comprising neutralizing the free alkalinity with stearic acid.

3. Process according to claim 1, comprising further neutralizing the excess of free alkalinity by adding ammonium sulfate to the reaction mass and leaving the resulting ammonium hydrate in the final product.

4. Satin white for paper glazes, paints and the like, prepared according to the process of claim 1.

5. Satin white for paper glazes, paints and the like, prepared according to the process of claim 3.

6. Process according to claim 2 wherein the final product is neutralized to a pH of about 10 and has a calcium stearate content of about 7% by weight.

7. Satin white for paper glazes, paints and the like prepared according to the process of claim 6.

References Cited

UNITED STATES PATENTS

| | | | |
|---|---|---|---|
| 2,345,311 | 3/1944 | Wilson | 106—306 X |

FOREIGN PATENTS

| | | | |
|---|---|---|---|
| 1,115,482 | 5/1968 | Great Britain | 106—306 |
| 1,232,680 | 1/1967 | Germany | 106—306 |
| 1,210,113 | 2/1966 | Germany | 106—306 |
| 1,234,895 | 2/1967 | Germany | 106—306 |
| 44/5,334 | 3/1969 | Japan | 106—306 |
| 504,780 | 8/1954 | Canada | 106—306 |

TOBIAS E. LEVOW, Primary Examiner

H. M. S. SNEED, Assistant Examiner

U.S. Cl. X.R.

106—308 F